(12) United States Patent
Chen et al.

(10) Patent No.: US 9,811,288 B1
(45) Date of Patent: Nov. 7, 2017

(54) MANAGING DATA PLACEMENT BASED ON FLASH DRIVE WEAR LEVEL

(75) Inventors: Xiangping Chen, Shrewsbury, MA (US); Dennis T. Duprey, Raleigh, NC (US); Thomas E. Linnell, Northborough, MA (US); Qin Tao, Hopkinton, MA (US); Mark K. Ku, Wollaston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 13/341,006

(22) Filed: Dec. 30, 2011

(51) Int. Cl.
*G06F 12/02* (2006.01)
*G06F 3/06* (2006.01)

(52) U.S. Cl.
CPC .................................. *G06F 3/0679* (2013.01)

(58) Field of Classification Search
None
See application file for complete search history.

(56) References Cited

U.S. PATENT DOCUMENTS

| | | | |
|---|---|---|---|
| 8,473,678 B1* | 6/2013 | Rajasekaran et al. | 711/114 |
| 2007/0185934 A1* | 8/2007 | Cannon et al. | 707/204 |
| 2010/0121828 A1* | 5/2010 | Wang | 707/694 |
| 2011/0173484 A1* | 7/2011 | Schuette | G06F 11/0727 714/2 |
| 2012/0047346 A1* | 2/2012 | Kawaguchi | 711/165 |
| 2012/0297114 A1* | 11/2012 | Koizumi | G06F 12/0246 711/103 |
| 2012/0317337 A1* | 12/2012 | Johar | G06F 12/0246 711/103 |
| 2013/0111129 A1* | 5/2013 | Maki et al. | 711/117 |

* cited by examiner

*Primary Examiner* — Charles Rones
*Assistant Examiner* — Ryan Dare
(74) *Attorney, Agent, or Firm* — Krishnendu Gupta; Jason A. Reyes (57) ABSTRACT

A method is used in managing data in a data storage system. A tiered storage pool is identified wherein the storage pool includes multiple tiers having multiple storage units. A wear indicator for each of the multiple storage units is monitored. A first storage unit having a wear indicator greater than a second storage unit is identified. High activity data on the first storage unit is also identified. The identified high activity data is migrated from the first storage unit to the second storage unit.

20 Claims, 4 Drawing Sheets

MANAGING DATA PLACEMENT BASED ON FLASH DRIVE WEAR LEVEL

BACKGROUND

Technical Field

This application relates to managing data placement based on flash drive wear level.

Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to logically partition a set of disk drives into chunks of storage space, called logical units, or LUs. This enables a unified storage array to provide the storage space as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. A storage system may include a variety of storage devices that balance performance and cost objectives. Different types of disks may be arranged whereby the like kinds of disks are grouped into tiers based on the performance characteristics of the disks.

For example, a fast tier (also referred to as "higher tier" or "high tier") may include a group of very fast solid state drives (SSDs) used to store a relatively small amount data that is frequently accessed. A medium tier (also referred to as "mid tier" or "middle tier") may include a group of fast hard disk drives (HDD) used to store a larger amount of less frequently accessed data but at a lower performance level that SSDs. A slow tier (also referred to as "lower tier" or "low tier") may include a group of slower HDDs used to store very large amounts of data with a still lower level of performance as compared to SSDs and fast HDDs. It may be possible to have different tiers with different properties or constructed from a mix of different types of physical disks to achieve a performance or price goal. Storing often frequently, or hot, data on the fast tier and less frequently referenced, or cold, data on the slow tier may create a more favorable customer cost/performance profile than storing all data on a single kind of disk. To provide data protection, tiers may be arranged in a variety RAID (Redundant Array of Independent or Inexpensive Disks) configurations known in the art.

In connection with data storage, a variety of different technologies may be used. Data may be stored on disk devices (as described above), tape devices and flash memory devices, such as flash drives. Different storage technologies, such as a flash memory device, may fail primarily due to wear out or usage, such as after performing a certain number of write cycles to store data on the flash memory device. For example, a flash memory device that uses NAND flash memory and is an SLC (single level cell) device is expected to perform a specified number of writes to a cell. After performing the specified number of writes to the cell, that cell is expected to fail when attempting to subsequently write data thereto. As such, different techniques may be used when writing to the flash memory device. One technique is to use an error correction code (ECC) to allow recovery of data upon the occurrence of a write failure.

Another technique is wear leveling which attempts to balance or evenly distribute writes within a physical device. Thus, when performing a write operation to a flash memory device, the write operation may be performed to a logical location on the device which is then mapped to a physical location within the device. With wear leveling and flash memory devices, the particular physical location for the same logical location may change in accordance with a mapping of virtual to physical locations in order to achieve the desired equal distribution of writes across physical locations within the device. The foregoing is one example of a data storage technology and cause of wear out where the device may be expected to fail after a specified amount of usage.

SUMMARY OF THE INVENTION

A method is used in managing data in a data storage system. The method includes identifying a tiered storage pool wherein the storage pool includes multiple tiers having multiple storage units. A wear indicator for each of the multiple storage units is monitored. A first storage unit having a wear indicator greater than a second storage unit is identified. High activity data on the first storage unit is also identified. The identified high activity data is migrated from the first storage unit to the second storage unit.

BRIEF DESCRIPTION OF THE DRAWINGS

Features and advantages of the present invention will become more apparent from the following detailed description of example embodiments thereof taken in conjunction with the accompanying drawings in which.

DETAILED DESCRIPTION OF EMBODIMENT(S)

Flash drives are typically specified as having an expected lifetime (e.g., as measured in an amount of actual elapsed time such as a number of years, months, and/or days) based on a number of guaranteed write cycles and a rate or frequency at which the writes are performed. Thus, a flash drive may be expected to have a usage measured in calendar or wall clock elapsed time based on the amount of time it takes to perform the number of guaranteed write cycles. As discussed in more detail below herein, the techniques described herein may be used to help prolong the lifetime or expected lifetime of a group of flash drives associated with a tier in a storage pool that may be included in a data storage array by balancing high activity data across the group of flash drives. More generally, the techniques herein may be used to help improve the likelihood that any type of flash drive within a group of drives lasts for a specified amount of time (e.g., a required or specified lifetime) by migrating high activity data from drives having more wear to drives having less wear within their group (e.g., tier).

Figure 1:
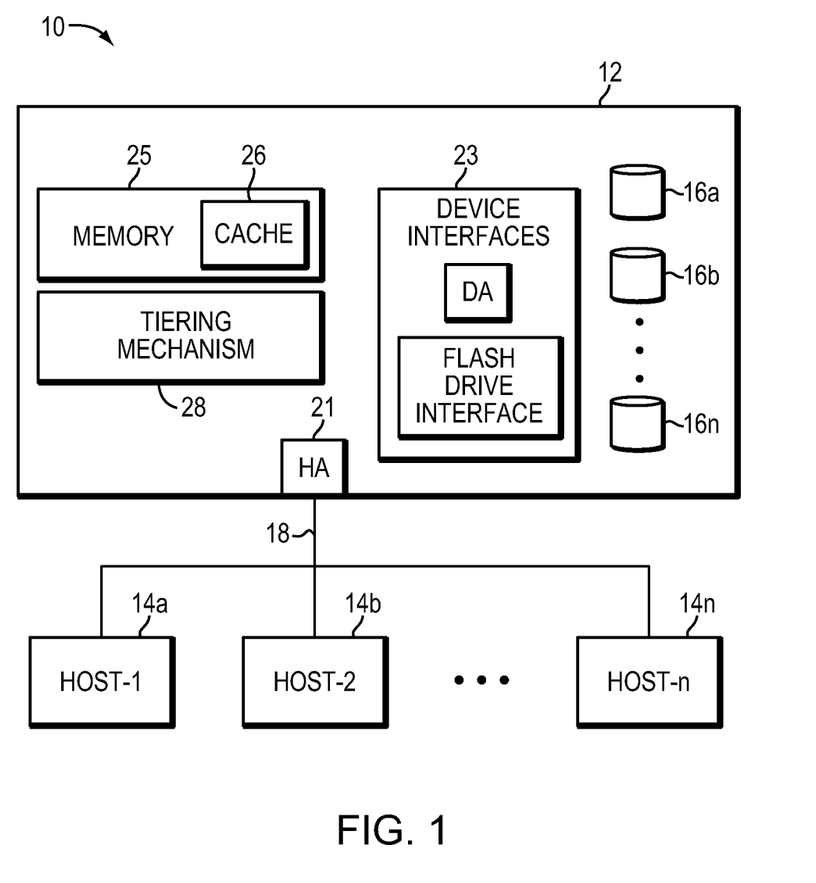
FIG. 1 is an example embodiment of a computer system that may utilize the techniques described herein.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives" or "flash drives") are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controller. The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not need to address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The data storage system 12 in the embodiment of FIG. 1 further comprises a host adaptor (HA) 21 coupled to the hosts 14a-14n via the communication medium 18, device interfaces 23, memory 25, cache 26, and tiering mechanism 28. The device interfaces 23 may comprise device adaptors and interfaces (e.g., a flash drive interface). Additionally, the cache 26 may be connectable to the device interfaces 23 if the cache utilizes flash drives in addition to memory.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a VMAX® data storage array and/or VNX® data storage array by EMC Corporation of Hopkinton, Mass. In the foregoing data storage array, the data storage devices 16a-16n may include a combination of disk devices and SSD, such as flash devices, in which the flash devices may appear as standard Fibre Channel (FC) drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two example types of devices that may be included in a data storage system used in connection with the techniques described herein.

Thus, the storage system may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an I/O request. In accordance with an embodiment of the current technique, storage devices with the same or similar characteristics may be grouped into two or more tiers For example, a group of solid state drives may comprise a fastest tier, a group of fast but small disks may comprise a fast tier, and a group of slow but large disks may comprise a slow tier. It should be noted that in addition to a storage tier, there may be a construct referred to as a storage pool. A storage pool ("pool") may be a reserve of storage devices that may be used, for example, to create LUs, as needed. A pool, as in the case of a storage tier, may be made up of devices with different performance and cost characteristics. Thus, devices within a pool may be partitioned into two or more tiers. In some embodiments, each pool may itself represent a tier. In this embodiment, a pool may be made up of only storage devices with the same or similar characteristics.

In some embodiments, it may also be possible to bind or designate a set of data storage resources, such as logical and/or physical devices, a portion of cache 26, and services, such as a software vendor's service for providing data replication, to one or more of the tiers. The set of resources associated with or designated for use by a tier or grouping within a pool may be characterized as a dynamic binding in that the particular set of data storage system resources associated with a tier may vary from time to time. This binding or association of logical to physical may be kept by making or updating entries in the map. Also, the configuration for the data storage system, aspects of the current data storage system resources (e.g., types of devices, device storage capacity and physical device characteristics related to speed and time to access data stored on the device), and current workload and other dynamic aspects (e.g., actual observed performance and utilization metrics) of the data storage system, may also change over time.

As described above, the data storage system 12 may be a data storage array including a plurality of data storage devices 16a-16n in which one or more of the devices 16a-16n are flash drives. In one embodiment, the data storage system 12 may be a VMAX® or VNX® data storage array by EMC Corporation of Hopkinton, Mass. In the foregoing data storage array, the data storage devices 16a-16n may include a combination of disk drives and flash drives in which the flash drives may appear as standard Fibre Channel drives to the various software tools used in connection with the data storage array. The flash drives may be individually optimized for write longevity using a variety of different techniques known in the art, such as wear leveling. Wear leveling may be characterized as a technique that attempts to arrange or store data on a flash drive where erasures and rewrites are evenly distributed so that no single cell prematurely fails due to a high concentration of writes. Additionally, a data storage array may utilize some techniques in connection with flash drives, other SSDs, and also disks. For example, bad blocks, or other portions of a drive may be mapped out so that once discovered, they are not subsequently used for storing data. Techniques such as wear leveling and mapping out bad blocks or other bad data portions may be used in combination with the techniques described herein in following paragraphs for flash drives.

In an example embodiment of the current technique, data storage systems that comprise storage devices of varied performance characteristics grouped into tiers can be managed in such a way as to emulate a storage system comprising only the fastest performing devices. A particular embodiment may help achieve this emulation by automatically migrating data among the tiers based on the temperature and write activity of the data. In general, in accordance with an embodiment of the current technique, hot data is migrated to faster (and typically more expensive) storage, and cold data is migrated to slower (and typically less expensive) storage. Warm data may be migrated to either type of storage. Data may also be migrated within a tier as well. For example, hot data may be further migrated within an SSD tier by migrating particularly hot data from a flash drive having a high write count to a different drive having a low write count, thereby reducing potential early SSD drive failures. Migration may be accomplished by copying the data and changing the map entries for the logical addressed that were involved to reflect the new logical to physical association.

Migrating hot, warm, and cold data to a targeted storage with differing cost/performance characteristics may help provide reduced early SSD drive failure and an improved total cost of ownership (TCO). By using a variety of different devices, the storage array can improve performance without users having to expend time to categorize and manage tiers of storage. (User may include an administrator, customer, process, application, technician, programmer, or the like.) Data of a fine granularity can be migrated to, and/or within, the appropriate tier or pool using a rather limited set of resources.

The techniques herein may be generally used in connection with any type of flash drive in order to ensure that the flash drive lasts a specified lifetime. The flash drive may be, for example, a flash drive which is a NAND gate flash device, NOR gate flash device, flash device that uses SLC or MLC (multi-level cell) technology, and the like, as known in the art. As known in the art, MLC, in contrast to SLC, stores more than 1 bit per cell.

Additional information regarding moving slices between tiers can be found in U.S. patent application Ser. No. 12/647,867, entitled "AUTOMATED DATA RELOCATION AMONG STORAGE TIERS BASED ON STORAGE LOAD," filed on Dec. 28, 2009 and U.S. patent application Ser. No. 13/160,784, entitled "STORING DATA," filed 15 Jun. 2011, which is hereby incorporated herein in its entirety. Additional information regarding device lifetime determination can be found in U.S. Pat. No. 8,010,738, entitled "TECHNIQUES FOR OBTAINING A SPECIFIED LIFETIME FOR A DATA STORAGE DEVICE", issued on Aug. 30, 2011, which is hereby incorporated herein in its entirety. Additional information regarding wear leveling can be found in U.S. patent application Ser. No. 13/077,820, entitled "WEAR-LEVELING SYSTEM AND METHOD," filed on Mar. 31, 2011, which is hereby incorporated herein in its entirety.

Figure 2:
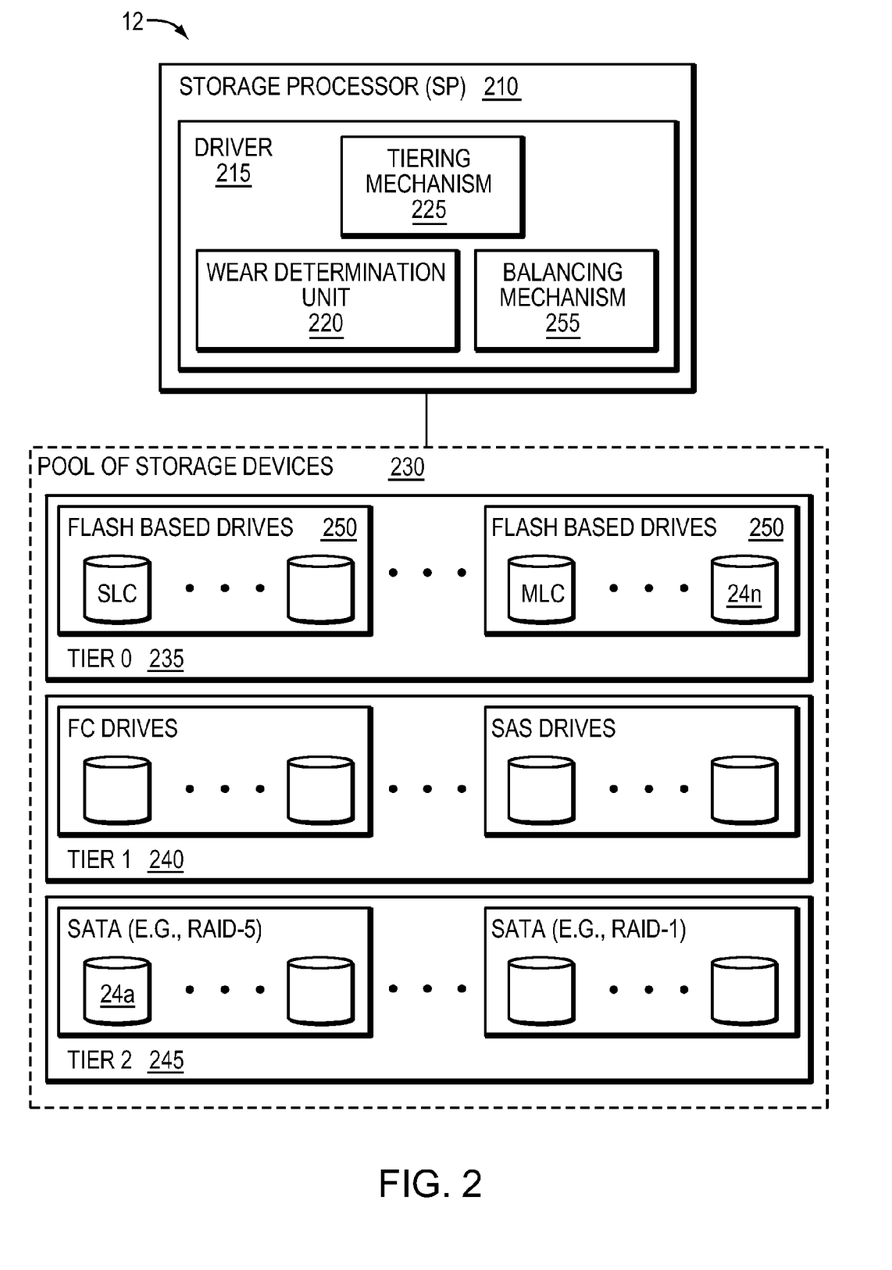
FIG. 2 is a block diagram illustrating an example embodiment of a data storage system that may utilize the techniques described herein.

Referring to FIG. 2, shown is a more detailed representation of components that may be included in an example embodiment using the techniques described herein. In the example, a data storage system 12 may include a pool of storage devices that includes a variety of disks 24*a-n* accessed by logical volumes as described above. The data storage system 12 may also include storage processing circuitry 210 having a driver 215 that operates in accordance with and/or helps implement a wear determination unit 220, a tiering mechanism 225, and/or a tier balancing mechanism 255. The driver 215 may be part of, work in conjunction with, or independent of the wear determination unit 220 and/or the tiering mechanism 225. As described in more detail below, one or more of the disks 24 may be, include, or be included in an SSD drive.

The pool storage devices 230 include a number of different types of storage devices having different performance/cost characteristics. The storage devices can be grouped together with like type devices to form a particular RAID configuration (e.g., RAID-5, RAID-1, etc.). The RAID groups may be designated as belonging to one of multiple tiers 235, 240, 245, where the tiers are categorized according to their corresponding performance characteristics. For example, tier 0 235, comprising SSD drives (e.g., flash drives having SLC and/or MLC devices), is the highest performing tier, tier 1 240, comprising FC and/or SAS drives, may be the next highest performing tier, and tier 2 245, comprising SATA drives, may be a lower performing tier. It should be noted that, different RAID group types can be group together in the same tier. For example, tier 2 may include RAID-1, RAID-5, RAID-6, and RAID-10 configurations. This feature, coupled with other elements of techniques described herein, advantageously enables the system to move data having a particular I/O pattern type to a RAID group having, for example, lower erasure count, and therefore, longer expected lifetime.

As known in the art, writing to a flash drive, such as one using SLC technology, includes performing a first operation to erase any existing data and then a second operation to write the new data to be stored. Although description herein may be made to performing a write operation to the flash drive for purposes of simplification in description, it will be appreciated that performing write operations to flash drives as described herein implies performing both the necessary erasure operation and write operation for writing data to the flash drive. Additionally, in connection with the foregoing, for examples described herein regarding flash drives, wear out or usage may be expressed as being dependent on a number of write operations performed although the wear out or usage is actually caused by (e.g., dependent upon) performing the implied erasure operation in order to effect the subsequent write operation to record or write new data to the flash drive. Thus, description herein for flash drives referring to wear out or usage based on a number of write operations implies the wear out or usage in accordance with the implied erasure operation necessary to effect the subsequent writing of the new data. In connection with obtaining a measurement regarding wear out or usage, the number of erasures or write operations may be used interchangeably.

It should be noted that an embodiment may use techniques herein with a flash drive that performs writes to a group or portion of cells of the device, such as a block of cells. Thus, when writing to the flash drive, a number of writes may be performed at a time in accordance with a number of cells in each block. For example, a write operation to store new data to a flash drive may write to a block of cells in which each block stores 128 kB (kilobytes) of data so that a single erase and write sequence of operations may be performed to write 128 kB of data as a unit to the block.

Continuing with FIG. 2, the wear determination unit 220 may be configured to determine a wear indicator for an SSD drive by monitoring the erasure count for the drive. This information may be obtained and/or stored in wear indicator map maintained by the SP. An embodiment may, for example, collect statistics on a number of writes to a drive such as by counting the number of erasures performed on the drive. This may be performed continuously or over a particular span of time. The foregoing information may then be used to compute statistics regarding a total number of times, as well as how frequently, a drive is written to. This information can be analyzed to identify, for example by rank ordering, drives with higher write counts and drives with lower write counts.

The tiering mechanism 225 may be configured to migrate data to the most appropriate tier based on a metric such as temperature. As discussed herein, temperature for a data object (e.g., data slice) can be determined based on the data's I/O activity. Thus, hot data may be migrated to faster storage (e.g., flash drive), cold data is migrated to slower storage (e.g., hard disk drive), and warm data may be migrated to either faster or slower storage, depending on, for example, the warm data's absolute temperature and available storage space. Migration maybe accomplished by copying the data and changing the map entries for the logical addressed that were involved to reflect the new logical to physical association.

Each tier, such as tier 0, may be created by specifying a tier definition (not shown). The tier definition may include one or more lines of text in a language which may be subsequently processed by code on the data storage system. The tier definition defines a tier indicated by a name value. The tier definition may include one or more clauses which may include one or more goal clauses and/or one or more configuration clauses.

As discussed above, data slice temperature may be categorized as hot, warm, or cold. However, more or less categories may be provided or defined. For example, different data may have different temperatures such as hottest, hotter, hot, warm, cold, colder, coldest, or anything in between. Alternatively, data temperature may be indicated using an arbitrary metric such as 0 degrees to 100 degrees and drive endurance-versus-performance management policies may use this metric for determining whether data should be relocated to particular drives. For example, an administrator may set a policy such that data warmer than 30 degrees and colder than 70 degrees should be relocated onto warm drives or the administrator may set a policy such that only data colder than 20 degrees should be relocated onto cold drives. It should also be appreciated that data temperature may decay over time such that a single or burst I/O request for a particular piece of data may raise the temperate only slightly. If the data continues to be requested, the temperature may continue to rise or, conversely, if no further I/O requests for the data are observed the temperature of the data may drop over time.

In one example embodiment, the balancing mechanism 255 may be configured to migrate data among different drives within a particular tier based on a wear in conjunction with the wear determination unit 220. For example, a fast tier 235 may comprise multiple flash drives 250. For the multiple flash drives, a wear indicator for each drive may be determined based on the respective drive's total lifetime erasure count. With this information, drives having higher erasure counts may be considered as having a high wear level, and thus, are approaching their rated maximum total write count. Drives having lower erasure counts may be considered as having a low wear level, and thus can be expected to have a projected longer life than high wear level drives. Drives in a particular tier may be rank ordered to sort drives according to wear level. Thus, the tiering mechanism 225 can be thought of as vertically migrating data up and down the different tier levels, whereas the balancing mechanism 255 can be thought of as horizontally migrating data among drives within a particular tier.

Conventional methods may be able to level wear within a drive, but they cannot level wear across multiple drives, e.g., within a particular tier. Thus, in conventional systems, a drive that experiences high write activity may fail sooner than expected, such as before the warranted design life. In such conventional systems, this can result in system failure, increased customer dissatisfaction, and increased manufacturer maintenance costs due to having to replace devices that failed within a warranty period. Conventionally it is possible for a drive maker, in at least some cases, to increase (e.g., double) the amount of memory in a drive to provide sufficient redundant space such that it is impossible or nearly impossible to exceed the drive's rated maximum total write count, but this not only wastes storage resources but is also becoming more difficult to achieve in a commercially reasonable way given the continuous rate of flash memory integration and die shrink resulting in a corresponding reduction in a flash device's total lifetime write count.

By contrast, at least some implementations in accordance with the techniques described herein may identify a drive in a particular tier experiencing an accelerated wear level, and may manage data such that high activity data (e.g., warm data) can be migrated to other drives in the tier having lower wear levels. In operation, the drives within a tier may experience wear in a balanced manner, thereby reducing the likelihood that a drive storing hot, write-heavy data fails sooner than expected as a result of exceeding its rated maximum total write count.

Accordingly, in an example embodiment, a tiered storage pool may be identified wherein the pool includes multiple tiers, such as a fast tier having flash drives. A wear indicator, such as erasure count, for each of the multiple drives may be monitored and/or stored in a wear indicator map. With this information, a drive having a higher wear indicator as compared to one or more other drives may be identified. To reduce the wear rate of the identified higher wear drive, data having a hot temperature may be migrated to another drive within the tier having a lower wear rate. Data may, but need not, be moved in slices. There may be instances where the wear level between the highest and lowest drive may be negligible. In this case, a threshold may be provided wherein data will not be migrated unless the difference between a high wear level drive and a low wear level drive exceeds the threshold. The threshold may be provided by a user via a graphical user interface (GUI), command line interface, or other such known input method. Alternatively, or in addition, the threshold may be determined and/or adjusted, via system software executing one or more techniques described herein. The current techniques also help enable this to be an automated migration occurring without user management.

In some alternative example embodiments, current techniques may make such determinations based on user or system policies. For example, the highest tier in a data storage system may be comprised of SLC devices and the second highest tier may be comprised of MLC devices. SLC devices have a significantly higher lifetime write count than do MLC devices. In this example, when considering which of the two tiers to migrate a hot slice, a user or system policy consider the SLC and MLC current and future expected wear levels relative to their respective lifetime write count and migrate accordingly.

The particular user or system policies used by the tiering mechanism and balancing mechanism may take into account the characteristics of the devices that comprise a tier. Data characteristics may also be considered, such as when knowledge of the data is available as may be the case when storage is provisioned to store particular types of data (e.g., email vs. database). For instance, in the example above with a first tier of SLC devices and a second tier of MLC devices, a policy may be used that takes into account the fact that current SLC devices are more ideal for write-heavy I/O because current MLC devices may more quickly suffer from degradation to data cell boundaries when used for write-heavy I/O as compared to SLC devices. Also, in addition to endurance differences mentioned above, current SLC devices also provide higher write speeds than current MLC devices. A policy may also take into account the fact that current SLC devices are typically more expensive than current MLC devices. Thus, to provide for the best performance and reliability of a data storage system generally and SSDs specifically, write-hot slices may be migrated to a first tier of SLC devices and read-hot slices may be migrated to a second tier of MLC devices. In another embodiment, a tier may be comprised of both SLC and MLC devices. In this embodiment, the number of reads and writes may be considered when determining which devices (SLC or MLC) within the tier a slice should be migrated to. In other words, a tier may consist of sub-tiers-a SLC sub-tier and a MLC sub-tier. In some cases, however, a slice may be stored on a mix of SLC and MLC devices.

Figure 3:
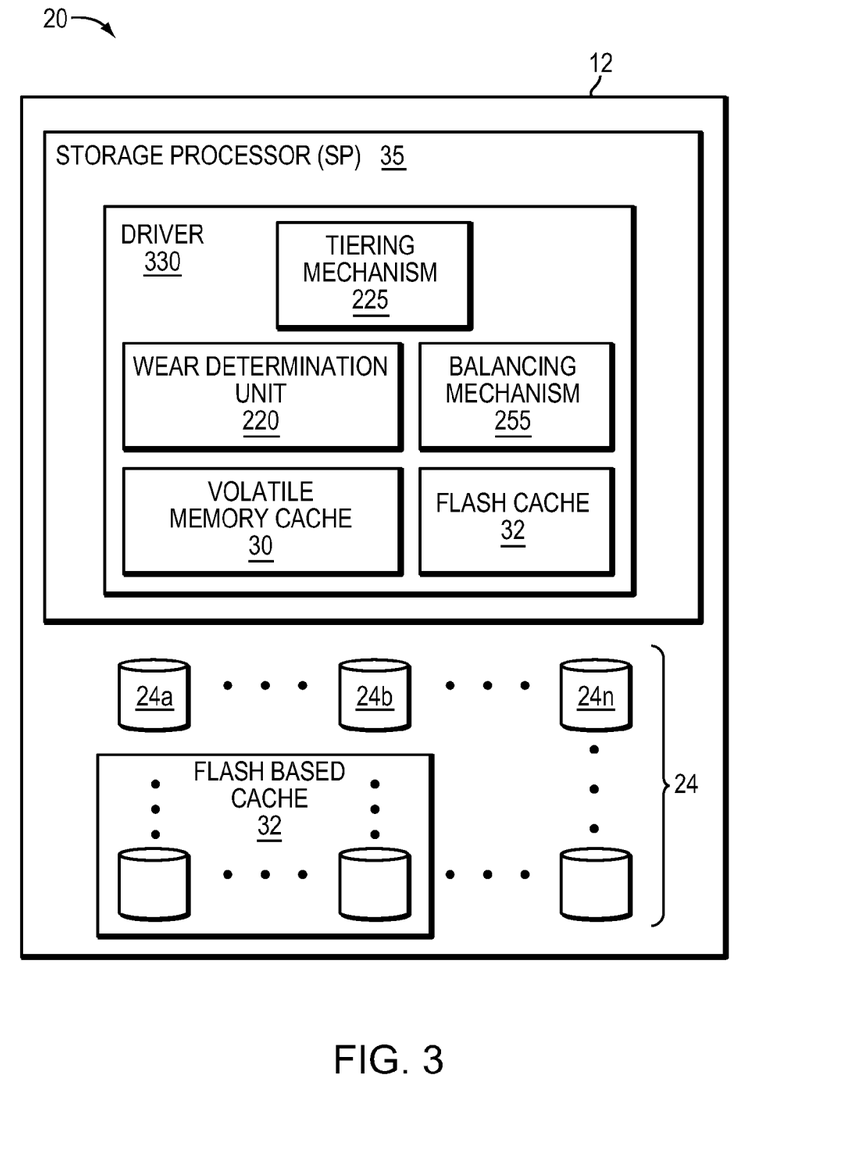
FIG. 3 is a block diagram illustrating an alternative example embodiment of a data storage system that may utilize the techniques described herein.

Referring to FIG. 3, shown is a more detailed representation of components that may be included in an alternative embodiment using the techniques described herein. In this embodiment, the tiering, wear determination, and balancing techniques described herein may be applied in a similar manner to a flash cache. That is, data in a flash cache having multiple flash drives may be managed in a way whereby hot data on a flash drive may be migrated to flash drives having a lower total write count, thereby balancing wear across all the cache's flash drives.

In the example 20, a data storage system 12 may include disks 24 accessed by logical volumes as described above. The data storage system 12 may also include a storage processor 35 having a driver 330 that operates in accordance with and/or helps implement a wear determination unit 220, tiering mechanism 225, balancing mechanism 255, volatile memory cache 30 and flash-based cache 32.

The volatile memory (VM) storage cache 30 may be any one or more different types of volatile memory, such as DRAM. The flash-based cache 32 is a flash-based memory or solid state drive (SSD) comprising multiple flash drives. The data storage system 12 may utilize a caching technique in which data for a request is written to or read into VM cache 30. The VM cache 30 is used to designate some portion of VM used as a cache although there may be other VM included in the data storage system for other purposes. During normal operations, based on I/O profiles, data from the VM cache 30 may be stored to a portion of the flash cache 32, and the data may be de-staged at a later point from the flash cache 32 to disk, and data may be read from disk into a portion of flash cache 32 and/or VM cache 30.

The driver 330 may be configured to perform data storage operations on behalf of the hosts of FIG. 1 during normal operation using the volatile memory storage cache 30, the flash based cache 32, and the disks 24. During normal operation in the case of a write request, when a host sends a request to write data to the data storage system, the driver 330 stores the data of the write request in the VM cache 30. Also, the controller may be configured to perform, for example, as a background process based on I/O profiles, to copy data from the VM cache to a portion of the flash cache 32. At some point later, the data is de-staged or written out to the disks 24 from the flash cache 32. During normal operation in the case of a read request, when a host sends a request to read data from the data storage system, the driver 330 reads the data of the read request from the VM cache 30 or flash cache 32 if such data is available there. Also, the controller may be configured to perform, for example, as a background process based on I/O profiles, to copy data from the VM cache or disks 24 to a portion of the flash cache 32 and/or from flash cache 32 or disks 24 to the VM cache.

As described above, different storage devices of varied performance characteristics can be partitioned into tiers and may be managed in such a way as to emulate a storage system comprising only the fastest performing devices. The concept partitioning storage devices into multiple tiers may be extended to storage system cache, in effect creating a hierarchy of caching tiers. In this embodiment, at least one of the caching tiers may include a large-capacity flash cache using flash drives (e.g., solid state disks) that is logically positioned between the storage processor's DRAM-based primary cache and the storage system's backend hard disk drives.

For example, flash drives may be used as flash cache to extend the storage system's existing caching capacity for better system-wide performance. Example embodiments may enable this by extending the functionality of DRAM cache by mapping frequently accessed data to flash cache flash drives. Alternative example embodiments may include arranging flash cache into a particular configuration wherein the flash cache comprises SLC and MLC flash devices. Although various example embodiments herein describe flash cache in the context of SLC and MLC flash devices, this is by way of illustration only and should not be construed as being limited as such. For example, other solid state devices such as phase change memory (PCM), single MLC (SMLC), and the like may be similarly implemented as flash cache. Furthermore, although various example embodiments herein describe flash cache in the singular, flash cache may include multiple sub-caches.

Thus, various embodiments employing techniques described herein may be applied to flash cache in a manner similar to the example embodiments presented above. For example, hot data on flash drives having high write counts may be migrated to flash drives having low write counts wherein the flash drives are configured as flash cache, thereby reducing the likelihood of early flash drive failure. As will be appreciated by those skilled in the art, the data storage 12 may also include other components than as described for purposes of illustrating the techniques described herein.

Figure 4:
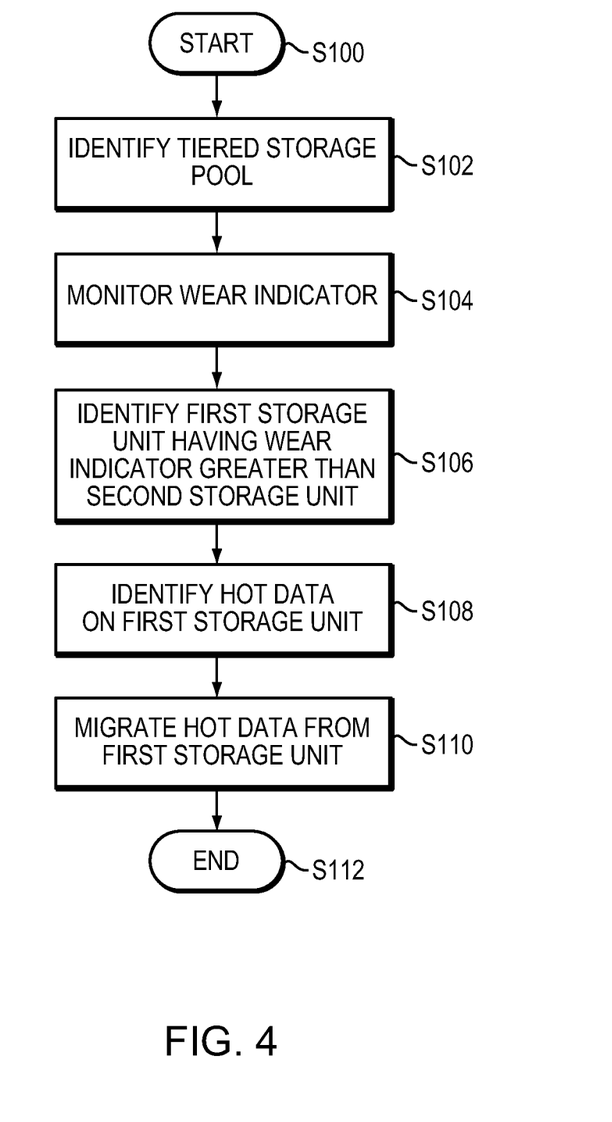
FIG. 4 is a flow diagram illustrating a process that may be used in connection with techniques described herein.

FIG. 4 illustrates a flowchart of an example embodiment employing the techniques described herein. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

As shown, the method can begin with a step S100. The method can be initiated manually by a user, for example by entering a command in a command-line-interface or by clicking on a button or other object in a GUI. The method can also be initiated automatically by storage management software and/or can be scheduled to run automatically at certain dates and times. In one embodiment, a storage system can be configured to execute the method of FIG. 5 for a predetermined number seconds, minutes, etc. during some off-peak period in which the storage system is typically at its lightest input/output (IO) load. Execution of the method can also be based on various user-specified constraints. For example, a user can specify the method run continuously or until a particular wear level differential across the flash drives is within a particular parameter. A user can also "throttle" future write activity, for example by specifying a certain maximum amount of system bandwidth that can be used for performing relocations into a fast tier.

The method can further include a step S102 in which a storage pool having multiple tiers is identified. The pool may be identified based on user input, or may be determined automatically via system software. In step S104, a wear indicator based on, for example, erasure counts may be monitored for one or more drives comprising the identified storage pool. The wear indicator may be monitored periodically, aperiodically, or continuously. Such results may be stored in a wear indicator map. In step S106, it may be determined that a first drive may be reaching it rated maximum write count at a rate that may cause it to fail with an intended design (e.g., before its warrantee period expires). The drive may be identified and a second drive having a lower wear level is also identified. Hot data (e.g., data having a high activity rate) on the first drive is identified and targeted for migration to the second, lower wear drive in step S108. In step S110, the identified hot data can be migrated from the first drive to the second drive. In this way, the wear level rate of the first drive may be reduced for a period of time so that its wear rate decelerates sufficiently such that the decreased wear rate may cause the drive to not exceed its maximum write count until its warranty period expires. The process may end at step S112, or alternatively, repeatedly continue again at step S102.

Although the previous examples illustrate a data storage system comprising multiple tier groups within a single data storage system, it should be noted that the tier groups may reside in different individual data storage systems. Furthermore, the multiple tier groups may be virtual tier groups that may be arranged such that they reside in a cloud configuration.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data in a data storage system, the method comprising:
   identifying a tiered storage pool wherein the storage pool includes multiple tiers, each tier having multiple storage units;
   monitoring a wear indicator and a wear rate for each of the multiple storage units wherein the wear indicator is based on a lifetime erasure count associated with the multiple storage units and the wear rate is associated with the rate at which the wear indicator increases;
   determining, for each of the multiple storage units, a predetermined warranty end period and a projected end of life value, wherein the end of life value is based on the wear indicator, the wear rate and the lifetime erasure count,
   identifying a first storage unit wherein the projected end of life value will occur before the corresponding warranty end period and a second storage unit wherein the projected end of life value will not occur before its corresponding warranty end period;
   identifying high activity data on the first storage unit wherein activity corresponds to an erasure count associated with the data; and
   migrating the identified high activity data from the first storage unit to the second storage unit.

2. The method of claim 1 wherein the storage units are flash storage drives.

3. The method of claim 1 wherein the wear indicator is associated with an erasure count for each of the multiple storage units.

4. The method of claim 1 wherein wear indicator information is stored in a wear indicator map.

5. The method of claim 1 wherein high activity data is identified based on a temperature value of the data.

6. The method of claim 1 wherein the data is a slice of data.

7. The method of claim 1 wherein the first storage unit is a drive having the highest wear indicator and the second storage unit is a drive having the lowest wear indicator.

8. The method of claim 1 wherein migrating further includes:
   receiving a threshold value;
   determining a differential metric associated with the wear indicators of the first storage unit and second storage unit; and
   in response to the differential metric exceeding the threshold value, migrating the identified high activity data from the first storage unit to the second storage unit and low activity data from the second storage unit to the first storage unit.

9. The method of claim 8 wherein the threshold is a dynamic value proportional to remaining expected life of a storage unit.

10. The method of claim 1 further comprising:
    determining a tier end of life value, wherein the value is based on the expected remaining life of substantially all the storage units in the tier; and
    in response to the tier end of life value exceeding a predetermined value, performing at least one of the following: migrating the identified high activity data from the first storage unit to a storage unit associated with a different tier, notifying a user, diverting future I/O activity to another tier, or reducing write performance.

11. A system for use in managing data in a data storage system, the system comprising a processor configured to:
    identify a tiered storage pool wherein the storage pool includes multiple tiers, each tier having multiple storage units;
    monitor a wear indicator and a wear rate for each of the multiple storage units wherein the wear indicator is based on a lifetime erasure count associated with the multiple storage units and the wear rate is associated with the rate at which the wear indicator increases;
    determined, for each of the multiple storage units, a predetermined warranty end period and a projected end of life value, wherein the end of life value is based on the wear indicator, the wear rate and the lifetime erasure count;
    identify a first storage unit wherein the projected end of life value will occur before the corresponding warranty end period and a second storage unit wherein the projected end of life value will not occur before its corresponding warranty end period;
    identify high activity data on the first storage unit wherein activity corresponds to an erasure count associated with the data; and
    migrate the identified high activity data from the first storage unit to the second storage unit.

12. The system of claim 11 wherein the storage units are flash storage drives.

13. The system of claim 11 wherein the wear indicator is associated with an erasure count for each of the multiple storage units.

14. The system of claim 11 wherein wear indicator information is stored in a wear indicator map.

15. The system of claim 11 wherein high activity data is identified based on a temperature value of the data.

16. The system of claim 11 wherein the data is a slice of data.

17. The system of claim 11 wherein the first storage unit is a drive having the highest wear indicator and the second storage unit is a drive having the lowest wear indicator.

18. The system of claim 11 wherein the processor is further configured to:
   receive a threshold value;
   determine a differential metric associated with the wear indicators of the first storage unit and second storage unit; and
   in response to the differential metric exceeding the threshold value, migrate the identified high activity data from the first storage unit to the second storage unit and low activity data from the second storage unit to the first storage unit.

19. The system of claim 18 wherein the threshold is a dynamic value proportional to remaining expected life of a storage unit.

20. The system of claim 11, wherein the processor is further configured to:
   determine a tier end of life value, wherein the value is based on the expected remaining life of substantially all the storage units in the tier; and
   in response to the tier end of life value exceeding a predetermined value, performing at least one of the following: migrate the identified high activity data from the first storage unit to a storage unit associated with a different tier, notify a user, divert future I/O activity to another tier, or reduce subsequent write performance.

* * * * *